(12) United States Patent
Galwas et al.

(10) Patent No.: US 8,768,366 B2
(45) Date of Patent: Jul. 1, 2014

(54) NETWORK OF MEDIA SERVERS AND A METHOD OF DYNAMICALLY ROUTING CALLS OVER THE NETWORK OF MEDIA SERVERS

(76) Inventors: Paul Anthony Galwas, St. Ives (GB); Raph Weyman, Hemel Hempstead (GB)

( * ) Notice: Subject to any disclaimer, the term of this patent is extended or adjusted under 35 U.S.C. 154(b) by 21 days.

(21) Appl. No.: 13/285,235

(22) Filed: Oct. 31, 2011
(Under 37 CFR 1.47)

(65) Prior Publication Data
US 2013/0109367 A1    May 2, 2013

(51) Int. Cl.
*H04W 40/00* (2009.01)
(52) U.S. Cl.
USPC ......... 455/445; 455/417; 455/418; 455/422.1
(58) Field of Classification Search
USPC ......... 455/445, 446, 447, 448, 449, 417, 418, 455/422.1
See application file for complete search history.

(56) References Cited

U.S. PATENT DOCUMENTS

| | | | | |
|---|---|---|---|---|
| 6,160,793 | A * | 12/2000 | Ghani et al. | 370/236 |
| 7,664,102 | B1 * | 2/2010 | Samarasinghe | 370/352 |
| 2001/0039659 | A1 * | 11/2001 | Simmons et al. | 725/61 |
| 2006/0179154 | A1 * | 8/2006 | Sitaraman et al. | 709/231 |
| 2008/0267387 | A1 * | 10/2008 | Strathmeyer et al. | 379/265.09 |
| 2009/0086950 | A1 * | 4/2009 | Vendrow et al. | 379/202.01 |
| 2010/0208634 | A1 * | 8/2010 | Eng et al. | 370/310 |
| 2010/0275131 | A1 * | 10/2010 | Kunz et al. | 715/752 |
| 2011/0019594 | A1 * | 1/2011 | Lesaint et al. | 370/271 |

* cited by examiner

*Primary Examiner* — Khai M Nguyen
(74) *Attorney, Agent, or Firm* — RatnerPrestia

(57) ABSTRACT

A communication system including one or more end points, each end point interconnected to a wireless network. The communication system also includes a media network system, the network system contains a registration server for registering device IDs of the end points in the communication system, a database for storing device IDs, one or more media servers for routing calls between end points and a signaling server for selecting one or more media servers to route a call between end points in the communication system based on an algorithm that evaluates one or more predetermined conditions.

30 Claims, 2 Drawing Sheets

NETWORK OF MEDIA SERVERS AND A METHOD OF DYNAMICALLY ROUTING CALLS OVER THE NETWORK OF MEDIA SERVERS

FIELD OF THE INVENTION

The present disclosure relates to providing voice and other real-time communications of digital data over networks that are bandwidth-limited and between resource-constrained devices such as mobile phones. In particular, the present disclosure relates to a communication system including a network of media servers and providing dynamic call routing over the network of media servers.

BACKGROUND OF THE INVENTION

Quality of service (QoS) is an important aspect of a communication system. The primary goal of QoS is to provide priority including dedicated bandwidth, controlled jitter and latency (required by some real-time and interactive traffic), and improved loss characteristics. However, existing mobile IP networks typically have variable quality of service (QoS) characteristics, which impedes real-time performance, resulting in poor latency, jitter and packet loss.

Voice and data travel in packets over IP networks with fixed maximum capacity. By default, IP routers handle traffic on a first-come, first-served basis. When a packet is routed to a link where another packet is already being sent, the router holds it on a queue. Should additional traffic arrive faster than the queued traffic can be sent, the queue will grow. If IP packets have to wait their turn in a long queue, intolerable latency may result. When the load on a link grows so quickly that its queue overflows, congestion results and data packets are lost.

The present disclosure is directed toward, but not limited to, improving the above noted problems by providing a resilient network of media servers and a mechanism for dynamically routing calls over the network, thereby providing QoS call routing which optimizes the overall quality of the communication system.

SUMMARY OF THE INVENTION

Exemplary embodiments disclosed herein provide an apparatus and method for dynamic call routing. The apparatus, for example, includes one or more end points, wherein each end point is connected to a wireless network; a media network system including a registration server for registering device IDs of the end points in the communication system, a database for storing device IDs, one or more media servers for routing calls between end points and a signaling server for selecting one or more media servers to route a call between end points in the communication system based on an algorithm that evaluates one or more predetermined conditions.

The method, for example, includes registering end point information in a database, receiving a request to make a call to an end point in the communication system, selecting one or more media servers to route the call between end points in the communication system based on an algorithm that evaluates one or more predetermined conditions, and routing the call over a path established by the one or more selected media servers.

DETAILED DESCRIPTION

The present disclosure describes a communication system which includes a network of media servers and a mechanism for providing dynamic call routing over the network of media servers. The mechanism uses an algorithm that evaluates factors, such as, for example, environmental conditions, the geographic location of end points, the availability of media servers, the load on the media servers, and QoS measurements of the media servers, in selecting one or more media serves to route a call.

Figure 1:
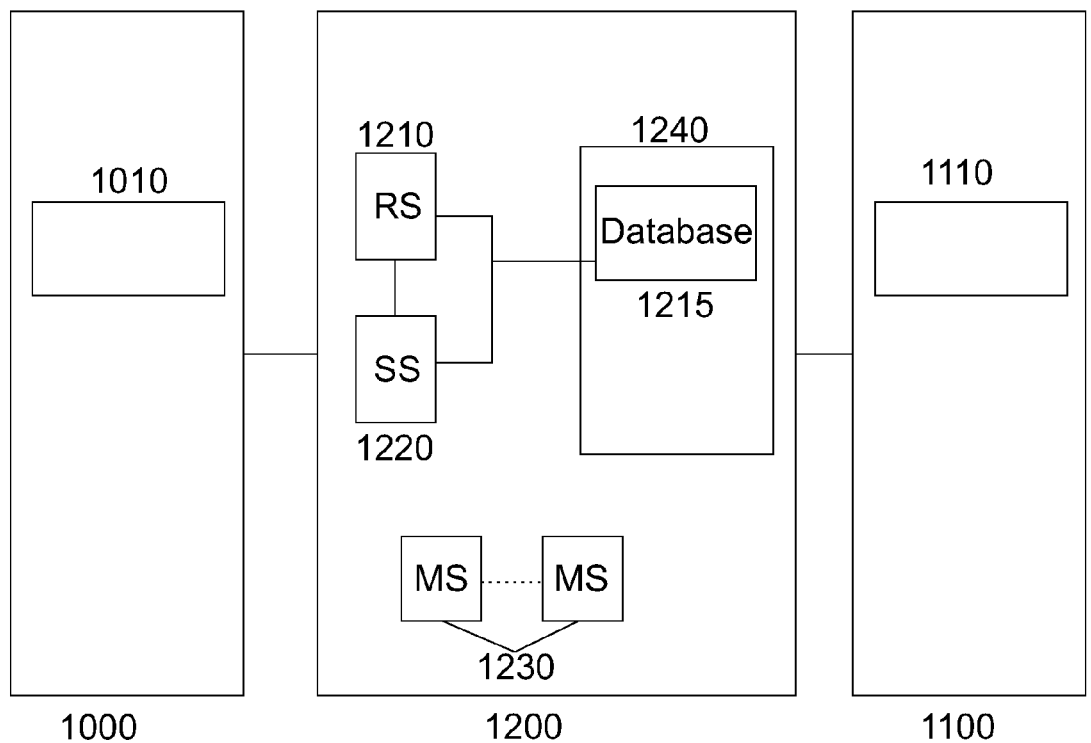
FIG. 1 is a block diagram illustrating an exemplary embodiment of a communication system as disclosed herein.

FIG. 1 is a diagram illustrating an exemplary embodiment of a communication system. The system includes mobile end point 1010 communicating over wireless network 1000 with media network system 1200, and end point 1110 communicating with the media network system over wireless network 1100. The media network system interconnects two end points in the communication system, and the communication system may include two or more end points.

Mobile end point 1010 includes mobile equipment (e.g., mobile phone) equipped with encryption modules. The encryption modules provide encryption and decryption functions for voice data in real time and establish a secure communication link with another end point in the communication system. The encryption modules can be processors embedded with computer readable instructions that when executed perform encryption and decryption functions.

End point 1110 can be, for example, another mobile end point, such as end point 1010, or a gateway device. The gateway device connects a traditional phone system, such as, for example, Public Switched Telephone Network (PSTN) and Private Branch Exchange (PBX) to media network system 1200. The gateway device converts the PSTN or PBX telephone traffic into an IP format for transmission over an IP network. The gateway is equipped with an encryption module to facilitate encryption and decryption functions. Transparent point to point encryption is provided between mobile end point 1010 and end point 1110.

The encryption modules may use redundant encryption schemes for session, authentication, digesting and/or key exchange. Preferred embodiments use two strong algorithms at the same time in series. The encryption of the data may be performed using any known cryptography algorithm, such as, for example, Elliptic curve Diffie-Hellman (ECDH), Rivest, Shamir and Adleman (RSA), Advanced Encyrption Standard (AES), Digital Signature Algorithm (DSA), etc.

Networks 1000 and 1100 are wireless network systems, such as, for example, Global Systems for Mobile Communication (GSM), Enhanced Data Rates for GSM Evolution (EDGE), General Packet Radio Service (GPRS), 3G GSM, HSPA, UMTS, CDMA and Wi-Fi.

Media network system 1200 contains a registration server 1210, a signaling server 1220, at least one media server 1230 and storage device 1240. Registration server 1210, signaling server 1220 and media server 1230 can each be implemented as one or more computer systems including, for example, a personal computer, minicomputer, microprocessor, workstation, mainframe or similar computing platform or network appliance, with embedded code therein for effectuating operations performed by the associated server.

Storage device 1240 can be implemented with a variety of components or subsystems including, for example, a magnetic disk drive, an optical drive, flash memory, or any other devices capable of persistently storing information. Storage device includes device database 1215, which contains a list of all the DeviceIDs known to the system.

A mobile end-point registers with the registration server 1210. The registration server 1210 verifies whether the end point is registered in its device database 1215. The end point sends a request to the signaling server to make a call to another end point (e.g., end point 1110) and the signaling server sets up the call. The end points send the real-time data to each other through media server(s) 1230.

To register, an end point (e.g., end point 1010) sends a registration message to registration server 1210 that contains its DeviceID, the protocol version, and authentication data. The registration server 1210 checks the DeviceID against its device database 1215. If the registration server 1210 accepts the end point's registration request, it returns a registration OK message that must contain only the DeviceID and a SessionID. The registration server 1210 creates the SessionID, and associates the SessionID with the DeviceID in database 1215.

In one aspect of the invention, an end-point (e.g., end point 1010) can derive the DeviceID from a hardware identifier in the end point, such as the GSM International Mobile Equipment Identity (IMEI). End point 1010 could also create the DeviceID, for example using a random number generator. The DeviceID could be delivered to the device database 1215 by an out-of-band channel.

In another aspect of the invention, another system component could generate the DeviceID and deliver it to the associated end point and the device database 1215 by out-of-band channels.

Figure 2:
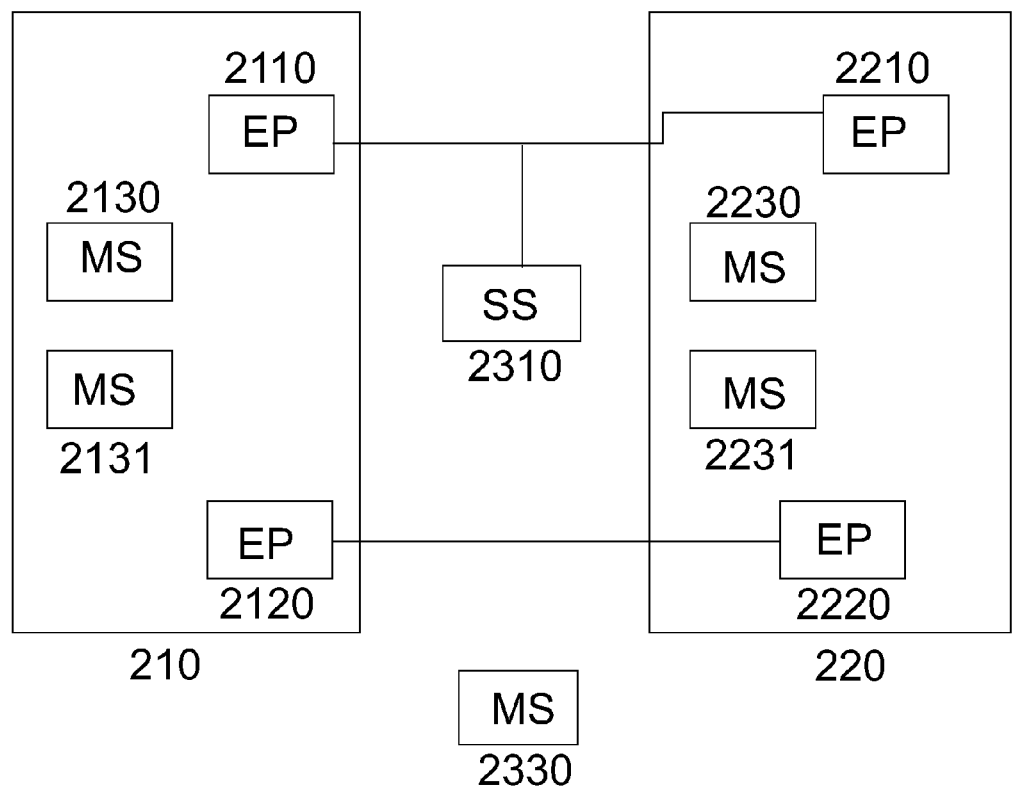
FIG. 2 is a block diagram illustrating an exemplary embodiment of the dynamic selection of media servers.

FIG. 2 is a diagram illustrating an exemplary embodiment of a network of media servers and the dynamic selection of media servers during call routing for end points that are in different and same geographies. The exemplary embodiment includes media servers 2130, 2131, 2230, 2231, 2330, signaling server 2310 and end points 2110, 2120, 2210 and 2220. End points 2110 and 2120 and media servers 2130 and 2131 are located at geography 210, which covers the spatial locality and/or the network nearness of references 2110, 2120, 2130 and 2131. End points 2210 and 2220 and media servers 2230 and 2231 are located at geography 220, which covers the spatial locality and/or the network nearness of references 2210, 2220, 2230 and 2231. Media server 2330 is not located at geography 210 or 220.

The signaling server 2310 selects one or more media servers (2130, 2131, 2230, 2231) to be used on a call using an algorithm that evaluates a range of conditions, such as, for example, the geographic location of one or both end points on the call; the availability of, or loading on, media servers; QoS measurements on the media servers; or a combination of these factors.

The signaling server 2310 can dynamically select the topology of the network path between the end points on a call. In particular, it can choose to route a call through a single media server (a single hop), or over a path that passes through more than one media server in a given order, using media servers as a hop proxy.

In one exemplary embodiment, signaling server 2310 selects the media server for a call between end points A( ) and B( ) depending on their geography and the availability of the media servers, using this algorithm:

If A (2110) and B (2120) are in same geography (210):
  1. Choose a media server (2130) in the same geography as A and B. If more than one media server is in the same geography then select between them using one of a range of methods.
  2. If no media server available in the same geography then choose a "favored" media server (8330). A "favored" media server is one which is marked as being generally available regardless of geography but need not necessarily be co-located with the signaling server. If more than one favored media server is available then select between them using one of a range of methods.
  3. If no favored media server available then use any unfavored media server. If more than one unfavored media server is available then select between them using one of a range of methods.

If A (2110) and B (2210) are in different geographies (210 and 220 respectively), using one media server:
  1. Choose a media server (2130) in the same geography as A. If more than one media server is in the same geography as A, then select between them using one of a range of methods.
  2. If no media server is in the same geography as A, then choose a media server in the same geography as B (2230). If more than one media server is in the same geography as B then select between them using one of a range of methods.
  3. If no media server available is in the same geography as either A or B, then choose a "favored" media server (2330). A "favored" media server is one which is marked as being generally available regardless of geography but need not necessarily be co-located with the signaling server. If more than one favored media server is available then select between them using one of a range of methods.
  4. If no favored media server is available, then use any unfavored media server. If more than one unfavored media server is available then select between them using one of a range of methods.

If A (2110) and B (2210) are in different geographies (210 and 220 respectively), using more than one media server:
  1. Choose a media server (2130) in the same geography as A (210). If more than one media server is in the same geography as A, then select between them using one of a range of methods.
  2. Choose a media server hop proxy (2230) in the same geography as B (220). If more than one media server hop proxy is in the same geography as B, then select between them using one of a range of methods.
  3. If a media server hop proxy is not available in the same geography as B always use a single media server.
  4. If a media server is not available in the same geography as A, then choose a media server in the same geography as B and use a single hop. If more than one media server is available in the same geography as B, then select between them using one of a range of methods.
  5. If no media server is available in the same geography as either A or B, then choose a "favored" media server (2330) (single hop). A "favored" media server is one which is marked as being generally available regardless of geography but need not necessarily be co-located with the signaling server. If more than one favored media server is available, then select between them using one of a range of methods.
  6. If no favored media server is available, then use any unfavored media server (single hop). If more than one unfavored media server is available, then select between them using one of a range of methods.

The signaling server (2310) determines the geography of A and B through the IP addresses of the messages that each end point sends.

The range of methods to select between media servers include:
1. Load balancing between them, based on the signaling server keeping a database of the number of calls currently active on each media server.
2. Picking the media server that offers the best quality of service (QoS), based on the signaling server probing the media server to establish the network conditions, or receiving QoS metrics, for example when a call finishes.

The signaling server dynamically selects the media server topology on a per call basis.

In another exemplary embodiment of the present disclosure, the only coupling between the signaling server and the one or more media servers is through s field value common to the signaling and media protocols.

As disclosed herein, embodiments and features of the invention can be implemented through computer hardware and/or software. Such embodiments can be implemented in various environments, such as networked and computing-based environments. The present invention is not limited to such examples, and embodiments of the invention can be implemented with other platforms and in other environments.

Moreover, while illustrative embodiments of the invention have been described herein, further embodiments can include equivalent elements, modifications, omissions, combinations (e.g., of aspects across various embodiments) adaptations and/or alterations as would be appreciated by those skilled in the art based on the present disclosure.

What is claimed:

1. A communication system comprising:
   one or more end points, wherein each end point is connected to a wireless network;
   a media network system comprising:
   a registration server for registering device IDs of the end points in the communication system;
   a database for storing the device IDs;
   one or more media servers for routing calls between end points; and
   a signaling server for selecting one or more media servers to route a call between end points in the communication system based on an algorithm that evaluates one or more predetermined conditions,
   wherein the predetermined conditions include the following sequential steps:
   1) selecting an available media server of the one or more media servers having a predetermined geography corresponding to at least one of the end points,
   2) when no media servers of the one or more media servers are selected in step 1, selecting an available media server of the one or more media servers meeting predetermined parameters, and
   3) when no media servers of the one or more media servers are selected in step 2, selecting any available media server of the one or more media servers.

2. The communication system of claim 1, wherein the end point is a mobile phone.

3. The communication system of claim 1, wherein the end point is a gateway.

4. The communication system of claim 3, wherein the gateway is connected to a Public Switch Telephone Network (PSTN) telephone system.

5. The communication system of claim 3, wherein the gateway is connected to a Private Branch Exchange (PBX) phone system.

6. The communication system of claim 1, wherein said one or more predetermined conditions include the geographic location of the end point relative to the location of a media server.

7. The communication system of claim 1, wherein said one or more predetermined conditions include the loads on each media server in a set of media servers.

8. The communication system of claim 1, wherein said one or more predetermined conditions include the measured quality of service or quality of voice of the media servers.

9. The communication system of claim 1, wherein said one or more predetermined conditions include the availability and status of the media servers.

10. The communication system of claim 1, wherein the signaling server determines whether to use one media server or multiple media servers to route a call based on the geographic location of the end point relative to the available media servers.

11. The communication system of claim 1, wherein the signaling server balances the load between media servers based on the number of calls currently active on each media server.

12. The communication system of claim 1, wherein the signaling server does not provide connection routing information to the one or more media servers.

13. The communication system of claim 1, wherein the signaling server provides a unique session identifier to all nodes of a network participating in a particular connection.

14. The communication system of claim 1, wherein the one or more media servers route traffic received from a network node to all other network nodes participating in a particular connection based on learned routing information.

15. The communication system of claim 14, wherein said one or more media servers learn routing information for all the network nodes participating in the connection from communication traffic received from each network node participating in the connection.

16. The communication system of claim 14, wherein all communication traffic associated with the particular connection include that connection's unique session identifier.

17. A method of dynamically selecting one or more media servers to route a call in a communication system comprising the steps of:
   registering, by a registration server, end point information in a database;
   receiving a request, at a signaling server, to make a call to an end point in the communication system;
   selecting, by the signaling server, one or more media servers to route the call between end points in the communication system based on an algorithm that evaluates one or more predetermined conditions,
   wherein the predetermined conditions include the following sequential steps:
   1) selecting an available media server of the one or more media servers having a predetermined geography corresponding to at least one of the end points,
   2) when no media servers of the one or more media servers are selected in step 1, selecting an available media server of the one or more media servers meeting predetermined parameters, and
   3) when no media servers of the one or more media servers are selected in step 2, selecting any available media server of the one or more media servers; and
   routing the call over a path established by the one or more selected media servers.

18. The method of claim 17, wherein the end point information is a device ID.

19. The method of claim 17, wherein the device ID is created from a random number generator.

20. The method of claim 17, wherein said one or more predetermined conditions include the geographic location of the end point relative to a media server.

21. The method of claim 17, wherein said one or more predetermined conditions include the loads on each media server in a set of media servers.

22. The method of claim 17, wherein said one or more predetermined conditions include the measured quality of service or quality of voice of the media servers.

23. The method of claim 17, wherein said one or more predetermined conditions include availability and status of the media servers.

24. The method of claim 17, wherein the signaling server determines whether to use one media server or multiple media servers to route a call based on the geographic location of the end point relative to the available media servers.

25. The method of claim 17, wherein the signaling server balances the load between media servers based on the number of calls currently active on each media server.

26. The method of claim 17, wherein the signaling server does not provide connection routing information to the one or more media servers.

27. The method of claim 17, wherein the signaling server provides a unique session identifier to all nodes of a network participating in a particular connection.

28. The method of claim 17, wherein the one or more media servers route traffic received from a network node to all other network nodes participating in a particular connection based on learned routing information.

29. The method of claim 28, wherein said one or more media servers learn routing information for all the network nodes participating in the connection from communication traffic received from each network node participating in the connection.

30. The method of claim 28, wherein all communication traffic associated with the particular connection include that connection's unique session identifier.

* * * * *